Feb. 5, 1952        A. A. SWEENY ET AL        2,584,938
BRAKE RELEASE SIGNAL FOR AUTOS
Filed Nov. 10, 1949
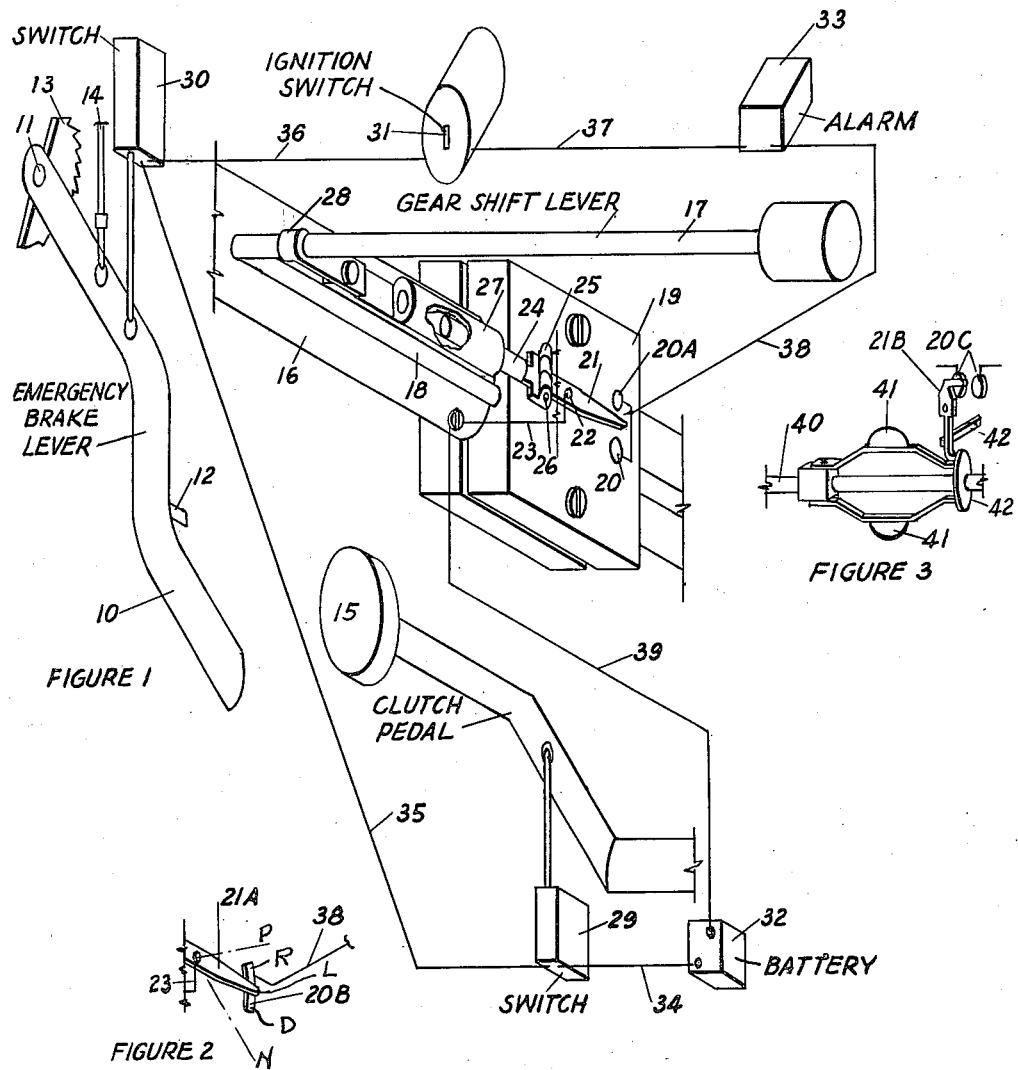
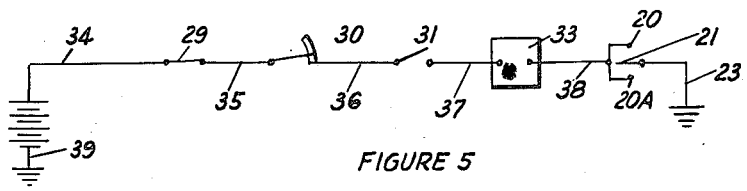
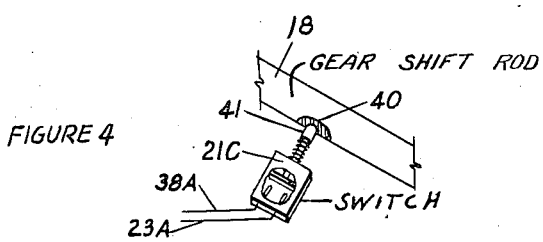
INVENTORS
ALFRED A. SWEENY
MAURICE F. SWEENY
BY
Anderson + Muller
ATTORNEYS Patented Feb. 5, 1952

2,584,938

UNITED STATES PATENT OFFICE 2,584,938

BRAKE RELEASE SIGNAL FOR AUTOS

Alfred A. Sweeny, Denver, and Maurice F. Sweeny, Silt, Colo.

Application November 10, 1949, Serial No. 126,628

7 Claims. (Cl. 177—311)

1

This invention relates to alarm devices for indicating when the emergency brake of an automobile is applied.

Certain alarm devices of the general class to which this invention pertains have heretofore been proposed, such as that characterized by Patent No. 1,737,774, but so far as is known, none of these devices disclose systems which operate an alarm at only the times when it should operate.

One of the objects of this invention is to provide an alarm system of the class referred to which is operable only when certain conditions of operation of the vehicle exist.

Another object is to provide the system with suitable switches which establish an alarm circuit only when the automobile is in motion or just about to be put into motion.

A further object is to utilize certain movable parts of the automobile to establish the conditions requisite for operating the alarm.

These and further objects, advantages and salient features of the invention will become readily apparent from the description to follow, the appended claims, and the accompanying drawing, in which:

Figure 1 is a view, partly in perspective, and partly diagrammatic, illustrating certain controls of an automobile, and the electrical circuits of the novel system associated therewith;

Figure 2 is a detail of a switch which may be employed on certain types of automobiles;

Figure 3 is a perspective of an alternative form of condition responsive means;

Figure 4 is a side elevation, partly broken away, showing another alternative form of the invention; and Figure 5 is a wiring diagram for any of the systems disclosed.

Referring in detail to the drawing, lever 10 is the control for the emergency brake, this lever, on modern passenger automobiles being pivotally mounted at 11 beneath the cowl with the lower end of the lever disposed adjacent and to the rear of the instrument panel. This lever has any conventional release means 12 for disengaging a ratchet pawl (not shown) engageable with ratchet quadrant 13, a cable 14, or the like, extending to the emergency brake. Since these parts are conventional and well known, and form no part of the invention per se they have been indicated somewhat diagrammatically to simplify the drawing. This brake lever is the one which the motorist sometimes forgets to release, with the result that the emergency brake lining is burned or damaged.

2

The clutch pedal is indicated at 15, this usually being pivoted at its lower end to the automobile and linked to certain parts of the clutch to release it when the pedal is depressed from its normal position away from the floorboard of the automobile.

The steering column 16 is provided with a gear shift lever 17 which effects engagement of certain gears in the speed change transmission, these usually being reverse and three speeds forward. As shown, the lever is in neutral position, that is, a position wherein no driving engagement exists between the engine and the wheels of the automobile. Steering post mounted shifting devices vary somewhat in construction, but the one shown is exemplary of all those used on modern automobiles. Shifting lever 17 is connected to shifting rod 18 which is mounted for axial oscillation adjacent the steering post and also mounted for axial movement. A suitable block of insulation material 19 is secured to the steering post, this block having a pair of contacts 20, 20a. A switch arm 21 is pivotally mounted to the block by pivot 22, this arm being grounded to the automobile in any suitable manner such as shown by ground wire 23. The upper end of this switch has a rod 24 secured thereto by a hinge 25 which permits pivotal movement of rod 24 about hinge pin 26. This rod telescopes within a tube 27, the upper end of which is secured by a suitable clamp 28 to lever 17. When lever 17 is forced downwardly away from neutral position, tube 27 slides on rod 24. When lever 16 is then rotated in either direction to selectively engage a transmission gear, switch arm 21 is swung into engagement with either contact 20 or 20a. Similarly, when lever 17 is moved upwardly away from neutral position parts 24, 27 have relative movement, and when the lever is swung in either direction switch arm 21 will engage one of contacts 20 or 20a. It will now be apparent that this switching device establishes a circuit when lever 17 is moved away from neutral position and effects engagement of any of the speed change gears of the transmission.

The other switches in the circuit are switch 29, 30, and 31. Switch 29 is any suitable switch which is linked to the clutch pedal and will establish a circuit when the clutch pedal is in a position to engage the clutch and will open the circuit when depressed to disengage the clutch. Switch 30 is similar, and establishes a circuit when emergency brake lever is moved away from its position wherein the brake is completely released, that is, if the brake be applied, or partly applied, switch 30 will establish a circuit. Since switches of this type are well known and form no part of the invention per se, details thereof have been omitted in the interest of clarity. Switch 31 is the ignition switch normally provided on the automobile and the battery is indicated at 32. The alarm is indicated at 33, this being a buzzer, light, or any other warning device.

Assuming now that the motorist inadvertently fails to release the emergency brake lever and is about to set the car in motion, after closing the ignition switch and starting the engine he releases the clutch and moves lever 17 to engage one of the transmission gears. This establishes a circuit between contact 20 or 20a to ground same. Switch 30 is of course closed and when the clutch is engaged to thus start the car in motion switch 29 closes and completes the circuit this being by way of wire 34, switch 29, wire 35, switch 30, wire 36, ignition switch 31, wire 37, alarm 33, and thence to ground by wire 38 and switch arm 21. Wire 39 grounds the other terminal of the battery.

It will now be apparent that the automobile must be in motion, or conditioned for motion, before alarm 33 operates and this is the only time when it should operate. In prior systems, so far as is known, the alarms could either be false alarms or alarms which should not operate under certain conditions. As an example, comparing this invention with those formerly employing a clutch operated switch in the alarm circuit, it is apparent that a mechanic might be making adjustments or repair to the clutch and it would be undesirable to operate an alarm during such times. However, if he placed the automobile in motion, or was about to, after establishing a driving connection in the transmission, the alarm would operate immediately upon engaging the clutch, which of course, is another condition necessary to place the automobile in motion. Again, motorists often place the transmission gears in mesh when parked on a hill waiting for a traffic signal to change, holding the clutch released and the foot brake engaged. At this time it would not be desired to operate the alarm; however, it would be desired to operate it as soon as the automobile is again placed into motion by engagement of the clutch.

In certain automobiles the shift lever merely swings between various positions, as for example the Dynaflow transmission. The switch for this type of shift lever is shown in Figure 2 wherein a switch arm 21a swings onto a contact segment 20b when the transmission is in "Drive," "Low," or "Reverse" as indicated by D, L and R, respectively. When the transmission is in "Neutral," as indicated by N, no circuit will be established. Gear shift devices of this type are sometimes provided with a "Parked" position as indicated by P wherein the propeller shaft is locked against rotation. In this position, as in "Neutral," no circuit will be established. Since a clutch pedal is not employed, normally, with this type of transmission, switch 29 would merely be omitted in the series circuit.

In Figure 3 is illustrated an alternative form of the invention. In this form, a shaft 40 is connected to any part of the automobile which rotates when the automobile is in motion, for example, the speedometer or propeller shaft. The shaft is provided with governor weights 41 which move outwardly in response to rotation of shaft 40, moving disk 42 axially of the shaft and operating any suitable lever 21b, urged in one direction by spring 42 to close contacts 20c.

This construction takes the place of switch 21 in the circuit previously described and closes the circuit in response to automobile movement if the emergency brake is applied. When the movement responsive switch just described is employed the only other essential switch in the series circuit is switch 30 and, of course, alarm 33.

In Figure 4 is illustrated an alternative form of switch means for steering post shift devices. In this construction, shift rod 18, previously described, is provided with a cup shaped depression 40 at any suitable point along its length and a switch 21c secured to the automobile, this switch having an actuator 41, the end of which is spring urged into the depression, when rod 18 is in a "Neutral" position. When in such position the switch is open. When rod 18 is rotated or moved axially away from neutral position to engage one of the gears in the transmission, actuator 41 will be moved onto the circular surface of rod 18, in which position the switch will be closed. Switches of this type are well known in the art, and hence details thereof have been omitted to simplify the drawing. This construction may be employed in lieu of the switches shown in Figures 1 and 2, wires 38a, 23a being connected to the switch in the same manner as wires 38, 23 of Figure 1.

The construction just described is intended principally for installation at the factory where the automobile is manufactured, although it will be apparent that if depression 40 is not provided in shift rod 18, the mechanic making the installation may provide one. To more readily facilitate installation, as an accessory, however, a concentric semi-circular or split sleeve having depression 40 therein may be provided, the sleeve being secured to shift rod 18 in any suitable manner which will clamp or otherwise secure it thereto. This sleeve will, of course, have a cylindrical surface like shift rod 18 and the depression therein cooperate with actuator 41 in the same manner described for Figure 4.

Having described the invention what we claim as new is:

1. An emergency brake system for power driven vehicles of the type having an emergency brake actuator, a speed change transmission, a clutch, a clutch pedal, a battery, and ignition switch means, comprising; switch means adapted to be closed only when the emergency brake actuator is in a position applying the emergency brake, switch means adapted to be closed only when the clutch pedal is in a position to engage the clutch, switch means adapted to be closed only when a power driving connection is established through the transmission, an electrically operated alarm device, and a series circuit between terminals of the battery including all of the named switch means and the alarm device.

2. An alarm system in accordance with claim 1 wherein said last named switch means is closed when a manually controlled transmission shift means is moved away from a position wherein no driving connection is established through the transmission, said manually controlled transmission shift means including a lever mounted for movement on the steering column of the vehicle.

3. An emergency brake alarm system for power driven vehicles of the type having an emergency brake actuator, a speed change transmission, a shift device for the transmission mounted for movement on the vehicle steering column, a clutch, a clutch pedal, a battery, and an ignition switch, comprising; a switch operatively connected to the brake actuator adapted to be closed only when the brake actuator is in a position applying the emergency brake, a switch operatively connected to the clutch pedal adapted to be closed only when the clutch pedal is in clutch engaging position, a switch actuated by the shift device adapted to be closed only when the shift device is moved away from the neutral position thereof in which no power driving connection is established through the transmission, an electrically operated alarm device, and a series circuit between terminals of the battery including all of the named switches and the alarm device.

4. An alarm system in accordance with claim 3 wherein the shift device includes a movable lever and the switch actuated by the shift lever is constructed as an attachment adapted to be secured to the steering column, and means operatively connecting the last mentioned switch with the shift lever adapted to close it when the shift lever establishes a power connection through the transmission.

5. An alarm system in accordance with claim 4 wherein the means operatively connecting the switch and shift lever includes an extensible link interposed therebetween.

6. An alarm system in accordance with claim 3 wherein the shift device includes a movable shift rod mounted adjacent the steering column of the vehicle.

7. An emergency brake alarm system for automobiles comprising; an electrically operated alarm, and electric circuit means for operating said alarm when the emergency brake is applied and the automobile is in motion, said circuit means including a switch adapted to be automatically closed in response and under control of a part of the automobile drive system which continuously rotates only when the automobile is in motion.

ALFRED A. SWEENY.
MAURICE F. SWEENY.

REFERENCES CITED

The following references are of record in the file of this patent:

UNITED STATES PATENTS

| Number | Name | Date |
|---|---|---|
| 1,578,170 | Reiber | Mar. 23, 1926 |
| 1,584,233 | Lacy | May 11, 1926 |
| 1,737,774 | Sherwood | Dec. 3, 1929 |
| 1,880,849 | Damico | Oct. 4, 1932 |
| 2,489,617 | Byram | Nov. 29, 1949 |

FOREIGN PATENTS

| Number | Country | Date |
|---|---|---|
| 47,358 | Denmark | May 22, 1933 |